A. ANTOINE & J. ROOS.
TRUCK.
APPLICATION FILED OCT. 18, 1912.

1,109,654.

Patented Sept. 8, 1914.

WITNESSES:
M. A. Johnson
E. B. Johnson

INVENTORS:
Aloise Antoine
and Julius Roos
BY
Wm. H. Campfield
ATTORNEY

UNITED STATES PATENT OFFICE.

ALOISE ANTOINE AND JULIUS ROOS, OF PASSAIC, NEW JERSEY.

TRUCK.

1,109,654.  Specification of Letters Patent.  Patented Sept. 8, 1914.

Application filed October 18, 1912.  Serial No. 726,470.

*To all whom it may concern:*

Be it known that we, ALOISE ANTOINE and JULIUS ROOS, citizens of the United States, residing at Passaic, in the county of Passaic and State of New Jersey, have invented certain new and useful Improvements in Trucks; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a truck which can be used for transporting material, and is particularly adapted for use in factories, and is designed so that its top surface or platform can be raised and lowered, this type of truck being particularly adapted for use in plants where heavy articles must be transported and where it is now the habit of depositing a few sheets from a machine on a table, then transporting, by carriers, a few sheets at a time to another location where the sheets are to be used. This is the case in a great many industries where paper, sheet metal, cloth, and similar material that is heavy in bulk, must be subjected at different points to an operation or treatment.

This invention relates to a truck which can be drawn under a table, stand or similar support, can then have its platform raised so as to lift the table enough to have its legs clear the ground or floor, transport the table and its contents, and can then be lowered to permit the table to again rest on the floor, and a further lowering of the platform permits the truck to be run out from under the table.

The truck is so constructed that the platform rises flat, that is, it does not become tilted and is held against any horizontal movement, whereby stacked material is not disturbed, and if goods on tables is arranged in piles they can be lifted and transported by means of the truck without upsetting any of the piles.

The invention is illustrated in the accompanying drawing, in which—

Figure 1:
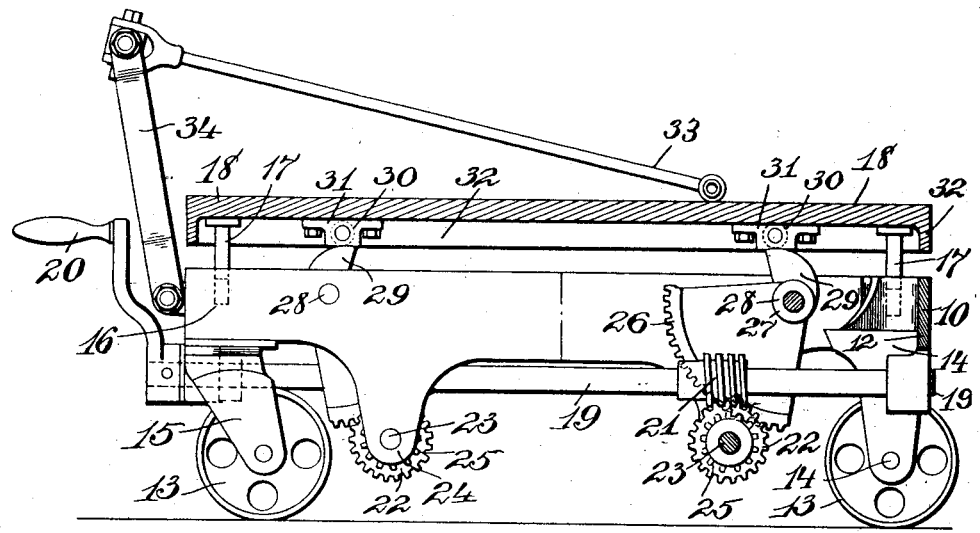
Figure 2:
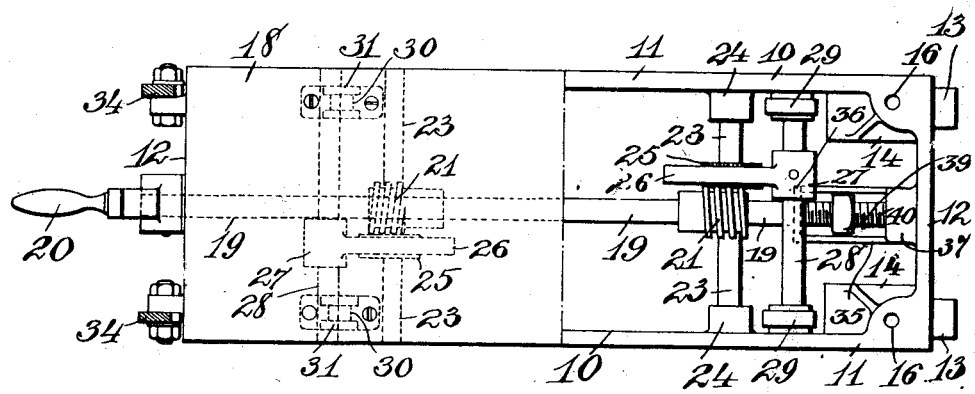
Figure 3:
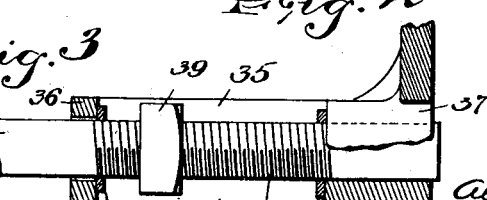

Figure 1 is a side view of the truck with the platform in section and the rear half of the truck cut away to show the elevating mechanism in side elevation. Fig. 2 is a top view with the rear half of the platform cut away to show part of the elevating mechanism in top elevation. Fig. 3 shows a stop mechanism.

The truck consists of a frame 10 which is rectangular, having the sides 11 and the ends 12. The truck is supported on wheels 13, the rear wheels being mounted in boxes 14 secured to the frame 10, the front wheel being mounted in the swiveled bearings 15, the swiveled front wheels permitting the direction of the truck to be changed when necessary. The frame 10 is provided with recesses 16 into which fit pins 17 on the platform 18, the pins sliding in the recesses and preventing horizontal movement of the platform 18, and extending longitudinally through the frame is a main shaft 19 which is provided on the front end, although the rear end can be used if preferred, with the handle 20 so that the main shaft can be turned. The main shaft is provided with worms 21 which are in mesh with the worm-gears 22 secured to the transverse shafts 23 which are mounted in the bearings 24 of the frame. The transverse shafts are provided with gears 25, which gears are placed on opposite sides of the main shaft, that is, the gear of one transverse shaft is on the right, and the gear on the other transverse shaft is on the left of the main shaft, each of the gears being in mesh with a rack 26, the rack being segmental and fastened, by means of its collar 27, to a cam-shaft 28. Each of the cam-shafts is arranged above the main shaft and each of the transverse shafts is arranged below the main shaft to economize space, the cam-shafts being provided, adjacent to their ends, with the cams 29, the cams being so disposed that when they turn outward at the top their projecting portions are thrust upward so that an outward turning of the cam forces the cam surface to engage the platform and raise it. These separated points at which these cams engage the platforms, and the cams acting in opposite directions, equalize the strain on the platforms from the cams, and reduce the strain on the pins 17.

To minimize the friction we supply the platform with rollers 30 in the bearings 31. The platform is provided with the marginal flange 32 which rests on the sides and ends of the frame when the cams are turned to their lowest position, that is, when the cams do not support the platform, it rests on the frame by means of the flange. For propelling or moving the truck we provide a handle 33 connected, by means of the bands 34, to the truck.

To provide means for stopping the elevating mechanism so as to prevent the rack 26 from passing out of mesh with the gear 25, we provide a bracket 35 which extends outward from the end piece 12, the cheek-pieces 38 of the bracket flanking the bearing 37 and being provided on the end with a stop 36 through which the main shaft 19 passes. A nut 39 is placed over the portion 40 of the shaft, this portion 40 being screw-threaded, the nut 39 resting between the cheek-pieces 38 so that the nut cannot turn. The screw-threaded portion is so proportioned that the turning of the main shaft 19 causes the nut 39 to travel to one end of its limit of movement so that when the main shaft is turned in one direction it is stopped by engagement with the stop 36, and when rotated in the other direction, is stopped by engaging the bearing 37, the nut then of course co-acting on the threaded portion of the shaft to stop the shaft from rotating. To prevent a too tight binding of the nut against its stops at either end, we provide washers 41 which may be of fiber or similar material and are resilient enough to prevent the binding of the nut by its being jammed on the thread.

Having thus described our invention, what we claim is:—

1. A truck consisting of a frame mounted on wheels, a platform movable vertically on the frame, pins on the platform, the frame having recesses to receive the pins to prevent horizontal movement of the platform, cams mounted to swing in the frame and engage the platform to support it at different elevations, transversely arranged cam-shafts on which the cams are mounted, said cam-shafts being near the top of the frame, segmental racks on the cam-shafts, a main shaft extending longitudinally through the frame below the cam-shafts and projecting from the end, a handle on the projecting end of the shaft, worms on the main shaft, transverse shafts in the frame below the cam-shafts, and gears on the transverse shafts, the gears engaging the racks and the worms.

2. A truck consisting of a rectangular frame mounted on wheels, a rectangular platform having pins on its under side, the frame being recessed to receive the pins whereby the platform is held against horizontal movement, cam-shafts mounted across the frame, spiral cams on the shafts, the cams being so disposed that when they are swung outwardly they act to raise the platform, rollers on the platform and resting on the cams, a main shaft extending longitudinally through the frame below the cam-shafts, a handle on the main shaft, transverse shafts mounted in the frame and below the main shaft, worms on the main shaft, worm-gears on the transverse shafts and meshing with the worms of the main shaft, gears on the transverse shafts, racks on the cam-shafts and in mesh with the gears of the transverse shafts, and automatic means for stopping the main-shaft when the cams have lifted the platform to its highest point.

3. A truck consisting of a frame mounted on wheels, a platform movable vertically on the frame, pins on the platform, the frame having recesses to receive the pins to prevent horizontal movement of the platform, cams mounted to swing in the frame and engage the platform to support it at different elevations, transversely arranged cam-shafts on which the cams are mounted, segmental racks on the cam-shafts, a main shaft extending longitudinally through the frame and projecting from the end, a handle on the projecting end of the shaft, worms on the main shaft, transverse shafts in the frame, gears on the transverse shafts, the gears engaging the racks and the worms, a portion of the main shaft being screw-threaded, a nut on the screw-threaded portion of the shaft and held against rotation thereon, and stops for limiting the longitudinal movement of the nut on the shaft.

In testimony that we claim the foregoing, we have hereunto set our hands this fifteenth day of October 1912.

ALOISE ANTOINE.
JULIUS ROOS.

Witnesses:
CHAS. A. BEREEN.
RUTH TROY.